United States Patent [19]
Eldridge et al.

[11] Patent Number: 5,333,391
[45] Date of Patent: Aug. 2, 1994

[54] GARDEN MARKER APPARATUS

[76] Inventors: Ann Eldridge; Henry V. Eldridge, both of 385 Otis Rd., Coldwater, Mich. 49036

[21] Appl. No.: 120,065
[22] Filed: Sep. 13, 1993
[51] Int. Cl.⁵ .................................................. G01B 3/10
[52] U.S. Cl. ........................................ 33/760; 33/759; 33/768; 33/1 H
[58] Field of Search ................. 33/759, 760, 761, 768, 33/770, 755, 756, 668, 1 H, 375, 521, 1 LE, 1 G, 769, 766, 27.02, 27.032, 27.03, 757, 758, 289

[56] References Cited

U.S. PATENT DOCUMENTS

| | | | |
|---|---|---|---|
| 671,690 | 4/1901 | Creasey | 33/27.02 |
| 1,259,886 | 3/1918 | McLeod | 33/766 |
| 2,581,858 | 1/1952 | Hilt et al. | 33/27.03 |
| 2,746,164 | 5/1956 | Eitzen | 33/375 |
| 3,289,306 | 12/1966 | Todd | 33/760 |
| 4,141,416 | 2/1979 | Broom | 33/413 |
| 4,989,341 | 2/1991 | Scotese | 33/759 |

FOREIGN PATENT DOCUMENTS

| | | | |
|---|---|---|---|
| 693273 | 8/1964 | Canada | 33/27.03 |

*Primary Examiner*—William A. Cuchlinski, Jr.
*Assistant Examiner*—Alvin Wirthlin
*Attorney, Agent, or Firm*—E. Michael Combs

[57] ABSTRACT

A device to permit marking of edges of a garden and the like is provided employing a flexible retractable tape mounted relative to a housing, wherein the housing is arranged to slidably receive a first flat post along a rear wall of the housing, with a round post through an opening within the tape to permit ease of length measuring relative to a garden scenario.

1 Claim, 4 Drawing Sheets

GARDEN MARKER APPARATUS

BACKGROUND OF THE INVENTION

1. Field of the Invention

The field of invention relates to marking apparatus, and more particularly pertains to a new and improved garden marker apparatus wherein the same is directed for the measuring of garden areas.

2. Description of the Prior Art

Tape measuring devices of various types are indicated in the prior art and exemplified by the U.S. Pat. No. 4,730,783.

The instant invention attempts to overcome deficiencies of the prior art by employing a tape measure housing cooperating with spaced posts when mounted to the tape housing rear wall, with a further post slidably directed through a measuring tape free distal end and in this respect, the present invention substantially fulfills this need.

SUMMARY OF THE INVENTION

In view of the foregoing disadvantages inherent in the known types of measuring device structure now present in the prior art, the present invention provides a garden marker apparatus wherein the same is directed to marking of lawns, borders, and the like utilizing readily mounted marking structure. As such, the general purpose of the present invention, which will be described subsequently in greater detail, is to provide a new and improved garden marker apparatus To attain this, the present invention provides a device to permit marking of edges of a garden and the like employing a flexible retractable tape mounted relative to a housing, wherein the housing is arranged to slidably receive a first flat post along a rear wall of the housing, with a round post through an opening within the tape to permit ease of length measuring relative to a garden scenario.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is another object of the present invention to provide a new and improved garden marker apparatus which may be easily and efficiently manufactured and marketed.

It is a further object of the present invention to provide a new and improved garden marker apparatus which is of a durable and reliable construction.

An even further object of the present invention is to provide a new and improved garden marker apparatus which is susceptible of a low cost of manufacture with regard to both materials and labor, and which accordingly is then susceptible of low prices of sale to the consuming public, thereby making such garden marker apparatus economically available to the buying public.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
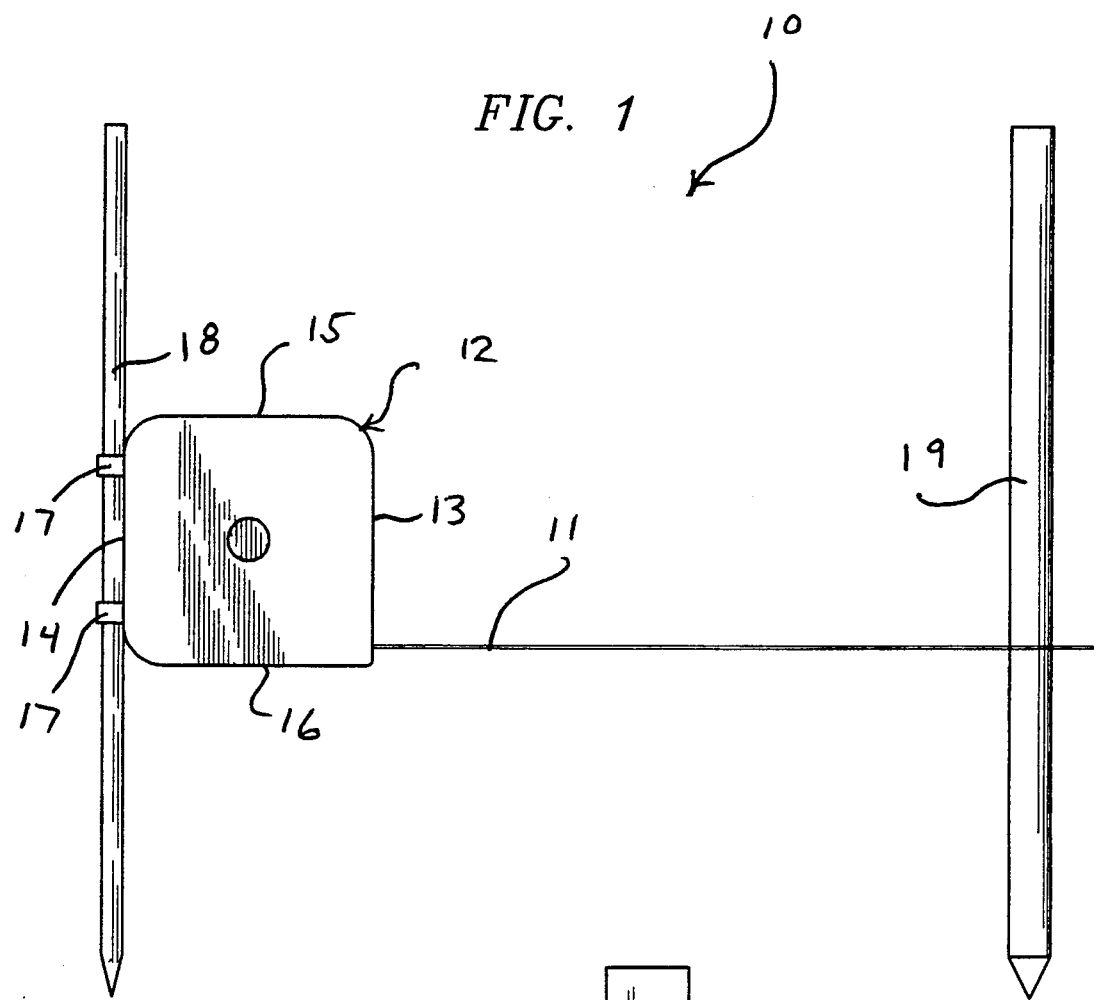
FIG. 1 is an orthographic view of the invention.
Figure 2:
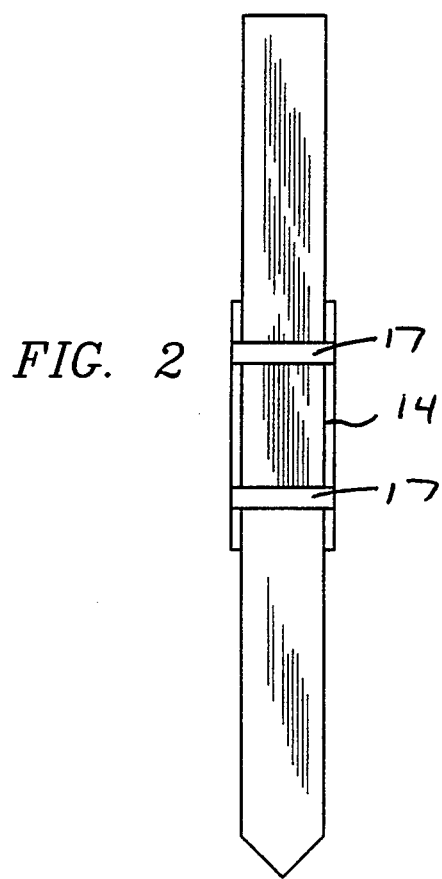
FIG. 2 is an orthographic rear view of the first post mounted to the tape housing.

With reference now to the drawings, and in particular to FIGS. 1 to 6 thereof, a new and improved garden marker apparatus embodying the principles and concepts of the present invention and generally designated by the reference numeral 10 will be described.

More specifically, the garden marker apparatus 10 of the instant invention essentially comprises a flexible measuring tape 11 arranged for retraction within a housing 12, in a manner as illustrated in U.S. Pat. No. 4,730,783 incorporated herein by reference.

Figure 3:
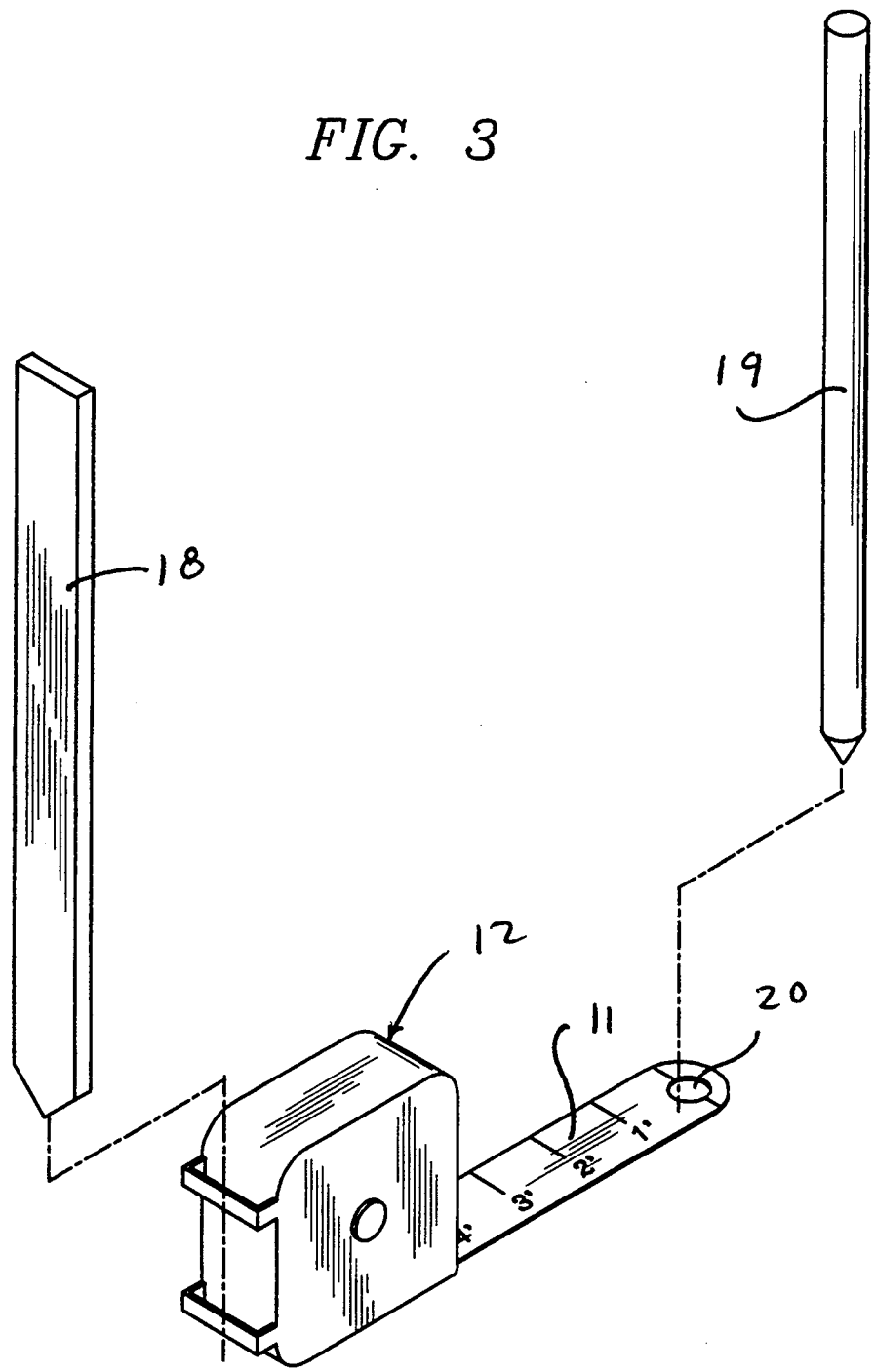
FIG. 3 is an isometric exploded illustration of the invention.
Figure 4:
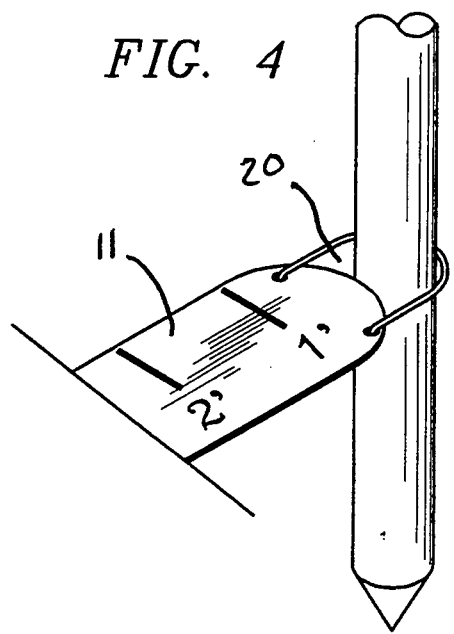
FIG. 4 is an isometric view of the tape measure employing a loop in lieu of the opening.

The housing 12 includes a front wall 13 spaced from a rear wall 14, and a top wall 15 spaced from a bottom wall 16. A plurality of spaced parallel rear wall rigid loops 17 are mounted to the rear wall 14 to slidably receive a first flat post 18 therethrough, having a first post lowermost pointed end for reception within an underlying ground surface, such that a second round post 19 is slidably received through a measuring tape opening 20 at a free distal end of the measuring tape 11, in a manner as indicated in FIG. 3, to thereby permit simultaneous sliding of the first post 18 and the second post 19 relative to the respective housing and measuring tape. Alternatively, a loop may be employed in lieu of the opening 20, in a manner as indicated in FIG. 4.

Figure 5:
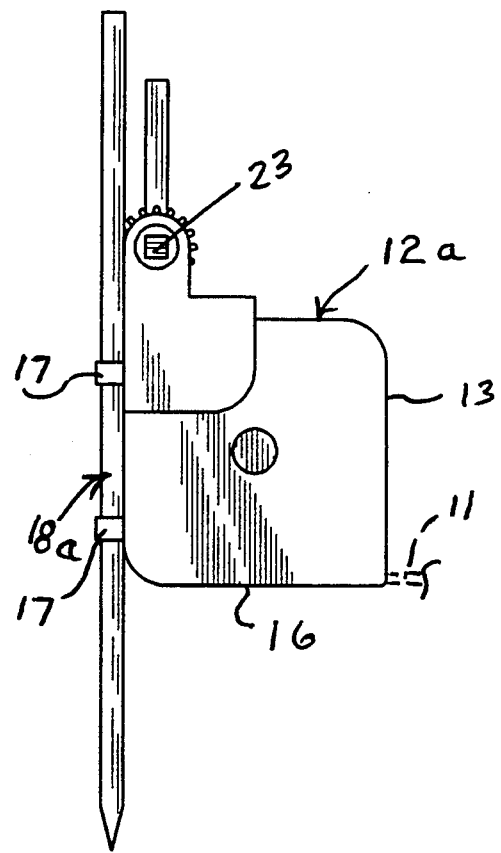
FIG. 5 is an orthographic side view of a modified tape housing structure.
Figure 6:
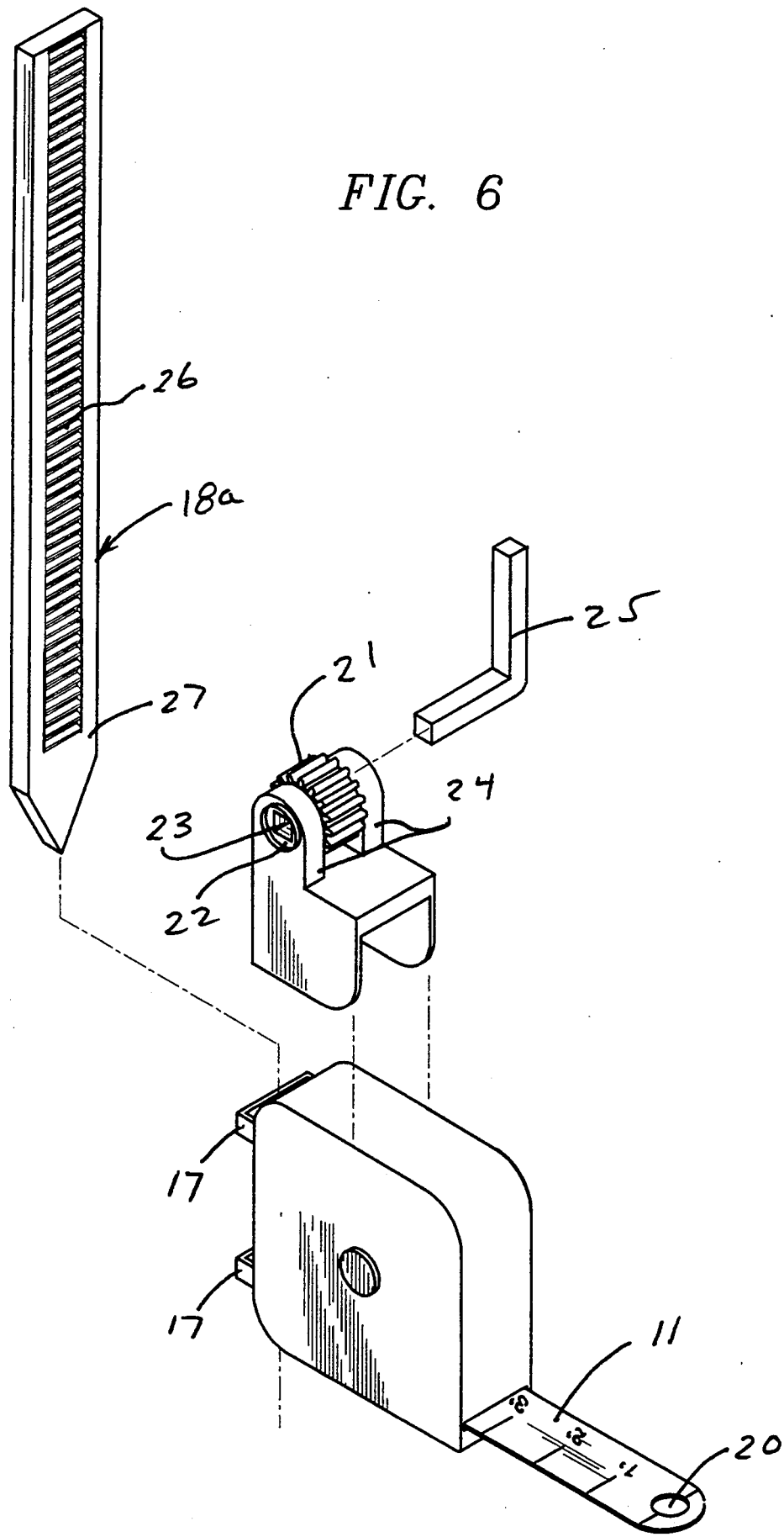
FIG. 6 is an isometric illustration of the modified structure in exploded view.

The FIGS. 5 and 6 indicate a means for incremental displacement of the tape housing 12a relative to a modified first flat post 18a, such that the first flat post includes a first post front wall 27 having spaced parallel ribs 26 arranged for cooperative engagement with a rotatable gear member 21 rotatably mounted about an axle 22, that in turn is rotatably mounted between spaced support plates 24 extending orthogonally relative to the top wall 15. The axle 22 includes at least one drive socket 23 arranged to receive a drive tool 25 therewithin to permit rotation of the axle 23 and simultaneous rotation of the gear member 21 in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A garden marker apparatus, comprising, a flexible tape housing having a front wall spaced from a rear wall, a top wall spaced from a bottom wall, with a flexible measuring tape retractably mounted within the housing through the front wall, with the measuring tape having a free distal end, the free distal end including an opening directed therethrough, and the housing rear wall including a plurality of spaced, parallel rigid loops, and a first flat post slidably directed through the rigid loops, and a second round post slidably received through said opening, and spaced support plates fixedly mounted to the top wall extending orthogonally therefrom, with an axle rotatably mounted through the support plates, with the axle having a drive socket received into said axle, and a drive tool arranged for reception within said drive socket, and a rotatable gear member fixedly mounted to said axle rotatable therewith, with the first flat post including a first post front wall in facing relationship relative to the gear member, and the first post front wall including spaced parallel ribs arranged for engagement with the gear member.

* * * * *